(12) United States Patent  
Barnett

(10) Patent No.: US 7,921,747 B2  
(45) Date of Patent: *Apr. 12, 2011

(54) COLLAPSIBLE CONTROL LEVER

(76) Inventor: Robert L. Barnett, Costa Mesa, CA (US)

( * ) Notice: Subject to any disclaimer, the term of this patent is extended or adjusted under 35 U.S.C. 154(b) by 879 days.

This patent is subject to a terminal disclaimer.

(21) Appl. No.: 11/029,668

(22) Filed: Jan. 5, 2005

(65) Prior Publication Data

US 2005/0160870 A1  Jul. 28, 2005

Related U.S. Application Data

(63) Continuation-in-part of application No. 10/463,212, filed on Jun. 17, 2003, now abandoned, which is a continuation of application No. 10/153,438, filed on May 22, 2002, now Pat. No. 6,578,445, which is a continuation of application No. 09/716,539, filed on Nov. 20, 2000, now Pat. No. 6,393,936, which is a continuation-in-part of application No. 09/543,943, filed on Apr. 6, 2000, now abandoned, which is a continuation-in-part of application No. 09/354,065, filed on Jul. 15, 1999, now abandoned.

(51) Int. Cl.  
*F16C 1/10* (2006.01)  
*G05G 1/04* (2006.01)

(52) U.S. Cl. .......................................... 74/502.2; 74/525

(58) Field of Classification Search ................ 74/473.3, 74/501.6, 502.2, 512–514, 523, 525  
See application file for complete search history.

(56) References Cited

U.S. PATENT DOCUMENTS

| | | | |
|---|---|---|---|
| 2,702,657 A | 8/1949 | Davis | |
| 3,747,431 A | 7/1973 | Uhlenhaut et al. | |
| 4,308,761 A | 1/1982 | Shimano | |
| 4,726,252 A | 2/1988 | Dawson | |
| 4,730,509 A | 3/1988 | Hornady | |
| 4,840,082 A * | 6/1989 | Terashima et al. | 74/523 |
| 4,921,081 A | 5/1990 | Chilcote | |
| 4,945,785 A | 8/1990 | Romano | |
| 4,976,166 A | 12/1990 | Davis et al. | |
| 5,078,023 A | 1/1992 | Scarborough | |
| 5,279,180 A | 1/1994 | Henriksson | |
| 5,287,765 A | 2/1994 | Scura | |
| 5,515,743 A | 5/1996 | Lumpkin | |
| 5,537,891 A * | 7/1996 | Nagano et al. | 74/525 |
| 5,575,178 A | 11/1996 | Wu | |
| 5,979,266 A | 11/1999 | Nagano | |
| 5,992,552 A | 11/1999 | Eto | |
| 6,047,611 A * | 4/2000 | Warren et al. | 74/489 |
| 6,393,936 B1 | 5/2002 | Barnett | |
| 6,435,075 B1 * | 8/2002 | Lamparter et al. | 92/129 |

* cited by examiner

*Primary Examiner* — James Pilkington  
(74) *Attorney, Agent, or Firm* — Knobbe, Martens, Olson & Bear, LLP

(57) ABSTRACT

A collapsible control lever suitable for use on a motorcycle includes a handlebar mount, an intermediate section and a lever section. The intermediate section and lever section are capable of rotation with respect to the handlebar mount between a relaxed position and an actuated position in order to provide control lever functions, such as disengaging a manual clutch. The lever section is capable of rotation with respect to the intermediate section between a normal position and a fully deflected position in order to avoid damage in the event of the motorcycle overturning. The lever section may be biased to its normal position.

8 Claims, 7 Drawing Sheets

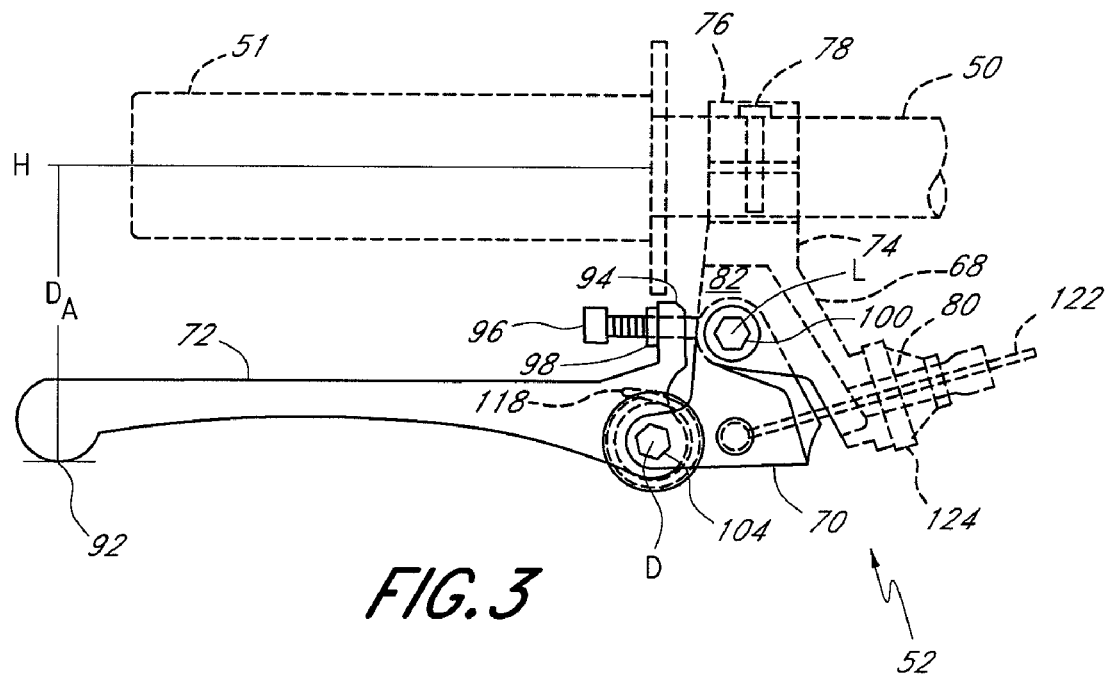

COLLAPSIBLE CONTROL LEVER

RELATED APPLICATIONS

This application is a continuation-in-part of U.S. patent application Ser. No. 10/463,212, filed Jun. 17, 2003 now abandoned, which is a continuation of U.S. patent application Ser. No. 10/153,438, filed May 22, 2002, now U.S. Pat. No. 6,578,445, which is a continuation of U.S. patent application Ser. No. 09/716,539, filed Nov. 20, 2000, now U.S. Pat. No. 6,393,936, which is a continuation-in-part of U.S. patent application Ser. No. 09/543,943, filed Apr. 6, 2000, abandoned, which is a continuation-in-part of U.S. patent application Ser. No. 09/354,065 filed on Jul. 15, 1999, abandoned, the entire contents of which are hereby expressly incorporated by reference herein and made a part of this disclosure.

FIELD OF THE INVENTION

The present application relates to control levers for vehicles. More particularly, the present invention relates to a collapsible control lever suitable for use on motorcycles.

DESCRIPTION OF THE RELATED ART AND SUMMARY OF THE INVENTION

In many motorcycles the brake and/or clutch is operated by a manual lever that is mounted to the handlebar. A bowden wire or hydraulic hose, depending on whether the brake or clutch is mechanical or hydraulic, extends from the lever to a structure that is to be operated, i.e. the brake or clutch.

Typically, the manual lever is located alongside the handgrip on the handlebar. To operate the lever the rider places one or more fingers around the handgrip and lever; the rider then applies a squeezing force to the lever to rotate the lever toward the handgrip. The lever movement produces a pulling force on the bowden wire, or a pushing force on a hydraulic plunger, again depending on the type of brake or clutch to be actuated.

One problem with conventional levers is that, due to the handlebar generally being the most outwardly disposed portion of the motorcycle, in the event of the motorcycle falling over the end of the lever may forcibly strike the ground causing the lever, or its mounting structure, to break. This could occur from the motorcycle being tipped from its kickstand or work stand. In another situation, the motorcycle could be subject to a crash while in motion. A manual transmission motorcycle is inoperable without a functioning clutch, therefore if the clutch lever is broken during a motorcycle race the rider will not be able to finish. In many racing events the rider must finish the race in order to score points; if a rider does not complete the race the rider is given a DNF (Did Not Finish) and is awarded zero points. A single DNF may cost a rider enough points to lose the championship in a series made up of individual races.

An attempted solution to this problem is illustrated in U.S. Pat. No. 6,047,611 to Warren et al. The Warren et al. control lever assembly uses a modified lever section having two pivots. The first pivot allows substantially fore and aft rotation about an axis, while the second pivot allows substantially up and down rotation about an axis. The purpose of the two pivots is to allow the lever to fold away such that the handlebar absorbs any impact from the ground as a result of the motorcycle falling over. Such a construction, however, has many drawbacks preventing it from being widely used. The multi-pivot construction of Warren et al. is complex, heavy and does not perform adequately in comparison with a conventional lever.

Another solution, used especially by motorcycle racers, is to modify the lever to provide a hole or notch on an outward portion of the lever. The purpose is to weaken the lever so that in the event of a crash the lever will break at the weakened area. The hole or notch is positioned such that a portion of the lever will remain intact to allow the rider to finish the race, however it must also be located far enough inward from the end of the handlebar so that the remaining portion of the lever is not in contact with the ground when the motorcycle is on its side. Otherwise, the lever would be subject to damage in a similar manner to a conventional lever. As a result, after a crash in which the lever is severed at the weakened area, the intact portion provides little space for the rider's fingers to actuate the lever. Therefore, with this approach the lever must be replaced after the race. As crashes are a frequent occurrence in motorcycle races, this method becomes quite impractical.

An aspect of the present invention involves the realization of several inherent disadvantages in a multi-pivot control lever, such as that illustrated in Warren et al. The disadvantages with respect to a conventional control lever include reduced cable pull (or plunger movement), reduced finger grip area, and unwanted motion of the lever.

Providing multiple pivots in a control lever takes up a significant amount of space, forcing the rider's fingers to be positioned further from the lever's axis of rotation (pivot) than a conventional lever. A control lever can only be positioned so far from the handlebar and still be comfortable for the rider to reach with his fingers. Therefore, the available rotational motion is limited and moving farther from the pivot reduces the amount the wire is moved relative to its sheath in a bowden wire arrangement, or the amount the hydraulic plunger is moved in a hydraulic arrangement (generically referred to as "cable pull"). As it is desirable to keep the rotational movement required at a minimum, increasing the distance of the lever input of the rider's fingers from the pivot of the lever presents a disadvantage.

An additional disadvantage to the multi-pivot construction is that the space taken up by the pivot assembly reduces the lever area available for the rider's fingers. As most riders use their inner one or two fingers to control the lever, the multiple pivots illustrated in Warren et al. decrease the most valuable portion of the lever.

The multi-pivot design as in Warren et al. includes a horizontal axis of rotation that allows substantially vertical movement of the lever. In order to be useful, the resistive element in the horizontal pivot of a multi-pivot lever construction must be flexible enough to allow the lever to move if the motorcycle were to fall over while at very low speeds or even while standing still. This is a disadvantage because most of the forces imparted on an off-road motorcycle are vertically oriented, such as from rough surfaces or the motorcycle landing from jumps. As a result, substantial vertical forces may cause undesired movement of the lever while the motorcycle is in use.

Accordingly, preferred embodiments of the present invention provide a collapsible control lever that inhibits breakage, avoids problems of the prior art and performs control functions as well as a conventional lever.

One aspect of the invention is a manual lever assembly for mounting on a handlebar including a handgrip. The lever assembly includes a handlebar mount defining a gripping surface for contacting a handlebar wherein the gripping surface defines a handlebar axis. The handlebar mount defines a first axis of rotation. The lever assembly additionally includes an intermediate section connected to the handlebar mount so as to be rotatable about the first axis between a relaxed position and an actuated position. The intermediate section defines a second axis of rotation and an actuator retaining portion. A lever section defining a finger grip portion and having a distal end and a pivot portion is connected to the intermediate section so as to be rotatable about the second axis of rotation. The lever section further has a normal position and a fully deflected position at least approximately 120° from the normal position. The distal end of the finger grip portion of the lever section defines a first perpendicular distance from the handlebar axis when the intermediate section is in a relaxed position. The distal end of the finger grip portion of the mount further defines a second perpendicular distance from the mount when the intermediate section is in an actuated position, the first distance being longer than the second distance.

A further aspect of the invention is a manual lever assembly for mounting on a handlebar including a handgrip. The lever assembly includes a handlebar mount defining a gripping surface for contacting a handlebar wherein the gripping surface defines a handlebar axis. The handlebar mount defines a first axis of rotation. The lever assembly additionally includes an intermediate section connected to the handlebar mount so as to be rotatable about the first axis between a relaxed position and an actuated position. The intermediate section defines a second axis of rotation and an actuator retaining portion. A lever section defining a finger grip portion and having a distal end and a pivot portion is connected to the intermediate section so as to be rotatable about the second axis of rotation. The lever section further has a normal position and a fully deflected position at least approximately 80°-90° from the normal position. The distal end of the finger grip portion of the lever section defines a first perpendicular distance from the handlebar axis when the intermediate section is in a relaxed position. The distal end of the finger grip portion of the mount further defines a second perpendicular distance from the mount when the intermediate section is in an actuated position, the first distance being longer than the second distance. The intermediate section and the lever section are prevented moving vertically relative to the mount.

BRIEF DESCRIPTION OF THE DRAWINGS

FIG. 3 is a plan view of the control lever of FIG. 2, shown in an actuated position.

FIG. 4 is a cross sectional view of the control lever of FIGS. 2 and 3 taken along section line 4-4 in FIG. 2.

DETAILED DESCRIPTION OF THE PREFERRED EMBODIMENT

The present invention has utility for use with a number of vehicles, including without limitation motorcycles, bicycles and other types of all-terrain vehicles where control levers are suitable. In addition, advantages present in preferred embodiments may be realized with a number of different control lever functions, such as for use with a manual clutch, braking systems or engine decompression systems provided to ease manual kick-starting. The clutch control lever is particularly desirable, however, for use on an off-road motorcycle.

Figure 1:
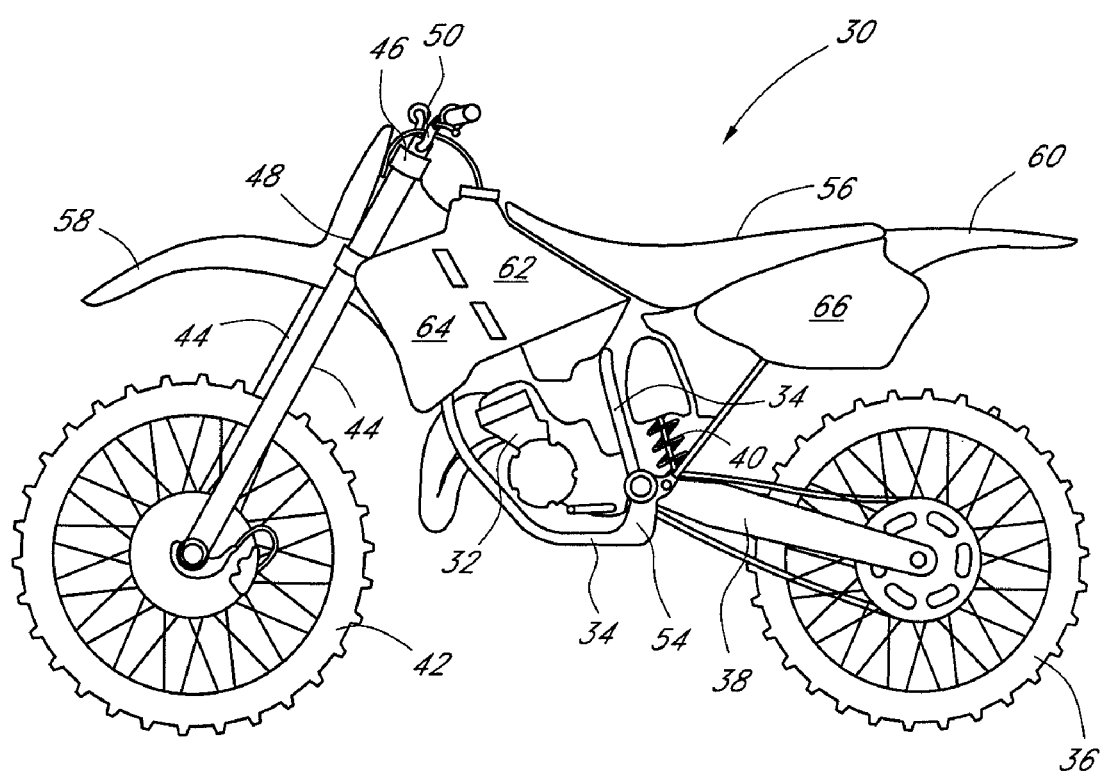
FIG. 1 is a perspective view of a preferred embodiment of a motorcycle with a collapsible control lever.

Referring now to FIG. 1, an off-road motorcycle, referred to generally by the reference numeral 30, is shown. Preferably, an internal combustion engine 32 mated to a manual transmission (not shown) is mounted into a frame 34. A rear wheel 36 is connected to the frame 34 through a rear suspension system comprised of a swingarm 38 and a rear shock 40. Preferably, the rear wheel 36 is driven by the engine 32 through a chain and sprocket assembly. A front wheel 42 is connected to the frame through a front suspension system comprised of telescoping forks 44 and upper and lower fork clamps 46, 48. The fork clamps 46, 48 are connected to a steering stem (not shown) that is journalled for limited rotation about a steering axis defined by the head tube (not shown) of the frame 34.

A handlebar 50 is preferably connected to the upper fork clamp 46 for steering of the motorcycle 30. Preferably, each end of the handlebar has a handgrip 51 for the rider to grasp. The handlebar 50 provides a surface in which to mount a plurality of rider controls, preferably including a twist-type throttle assembly, an engine stop button, a brake lever and a clutch lever 52. Additionally, certain motorcycles may also include an engine decompression lever. The decompression lever, while engaged, lowers the compression ratio of the engine to allow for easier manual kickstarting. Certain other motorcycles, when equipped with an electric start feature, may include an engine start button. A typical arrangement would place the throttle and brake lever on the right side of the handlebar 50 (from the perspective of a rider seated on the motorcycle) and the clutch lever 52 and engine stop button on the left side of the handlebar 50.

The motorcycle 30 also includes a pair of footpegs 54, preferably mounted to a lower portion of each side of the frame 34, on which the rider may place his feet. An elongated straddle-type seat 56 is provided for use when the rider is in a seated position. A plurality of body portions of the motorcycle 30 are provided, including front and rear fenders 58, 60, a gas tank 62, a pair of radiator shrouds 64 and a pair of side panels 66.

Figure 2:
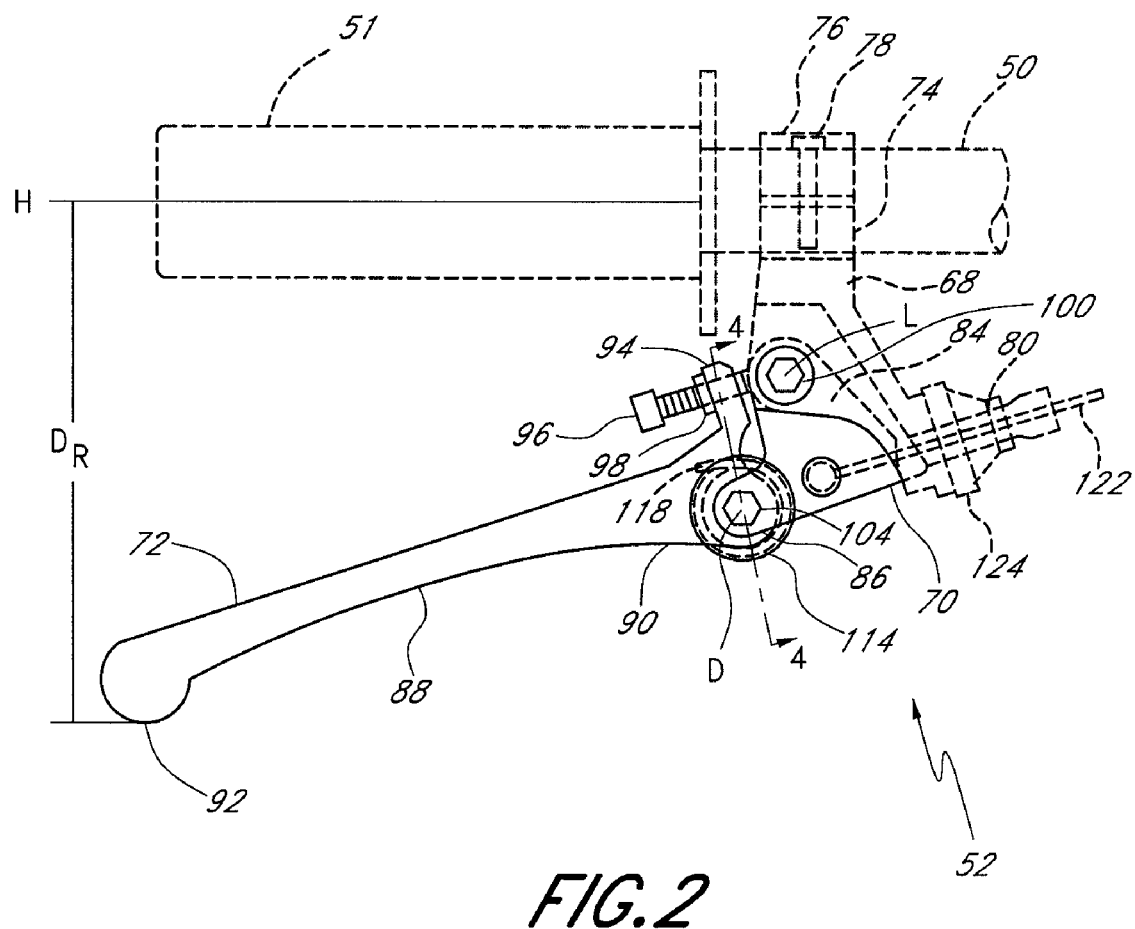
FIG. 2 is a plan view of a preferred embodiment of a collapsible control lever adapted to disengage a manual clutch assembly, shown in a relaxed position.

With reference to FIGS. 2-4, the clutch lever assembly 52 will now be described in detail. The lever 52 is comprised generally of a handlebar mount (or perch) 68, an intermediate section 70 and lever section 72.

The handlebar mount 68 is secured to the handlebar 50 by a clamping portion 74 that extends at least partially around the handlebar and a clamp plate 76 that is preferably connected to the clamping portion 74 through a pair of clamp bolts 78 (only one shown). The inner surfaces of the clamping portion 74 and the clamp plate 76 cooperate to form a gripping surface. The handlebar mount 68 may be rotated about an axis H defined by the gripping surface so as to place the lever 52 in a comfortable position for the rider of the motorcycle 30.

The handlebar mount 68 extends generally in a radial direction from the axis H terminating in a housing portion. The housing portion defines a cylindrical aperture 80 through which the bowden wire, or control cable 122 may pass. A pair of flange sections 82 extend outward from a central portion of the handlebar mount 68 defining a cavity that cooperates with a portion of the intermediate section 70.

The intermediate section 70 is generally "L-shaped" with one end comprised of a lever pivot tab 84 and the second end comprised of a pair of flange sections 86 defining a space or cavity. The lever pivot tab 84 is sized and shaped to cooperate with the cavity defined by the flanges 82 of the handlebar mount 68. The flanges 86 of the intermediate section 70 are spaced apart sufficiently to accommodate a portion of the lever section 72. The intermediate section 70 additionally defines a cable anchor cavity suitable to exert a pulling force on a bowden wire, in a well-known manner.

The lever section 72 comprises an elongated finger grip portion 88 with a pivot portion 90 at one end and a ball end 92 at the other. Desirably, the finger grip portion is at least one (1) inch long and, preferably, is at least 3½ inches long. The pivot portion 90 is sized and shaped to cooperate with the cavity defined by the flange sections 86 of the intermediate section 70. The lever section 72 additionally has a protruding tab portion 94 including a transversely extending threaded through-hole. A reach adjustment bolt 96 is threaded through the tab 94 and is held in a desired depth relative to the tab 94 by a lock nut 98.

As mentioned previously, the handlebar mount 68 is secured to the handlebar 50 of the motorcycle 30. The lever pivot tab 84 of the intermediate section 70 fits between the flanges 82 of the handlebar mount 68. The intermediate section 70 is connected to the handlebar mount 68 by a lever pivot bolt 100 that passes through corresponding apertures 68*a* and 70*a*, respectively, in each component 68, 70. Thus, the intermediate section 70 is capable of rotation relative to the handlebar mount 68 about an axis defined by the lever pivot bolt 100 (sometimes referred to herein as the lever pivot). FIG. 4 shows the lever pivot bolt 100 fixed by a retaining nut 102. Alternatively, the bottom flange 82 of the handlebar mount 68 could be provided with a threaded aperture to retain the lever pivot bolt 100. Other suitable methods of creating a rotational connection may also be used.

With primary reference to FIG. 4, the structure of the pivot that allows deflection of the lever section 72 of the clutch lever assembly 52 (sometimes referred to herein as the deflection pivot) will be described in detail. As previously mentioned, the pivot portion 90 of the lever section 72 fits within the cavity formed by the flanges 86 of the intermediate section 70. A deflection pivot bolt 104 is passed through corresponding apertures 70*b* and 72*a*, respectively, in the intermediate section 70 and lever section 72 allowing the lever section 72 to rotate relative to the intermediate section 70 about a deflection axis D defined by the deflection pivot bolt 104. Additionally, bushings 106 may be positioned between the intermediate section 70 and the lever section 72 to prevent wear of the components 70, 72 and contamination of the pivot. Obviously, other suitable methods of creating a rotatable joint may be used. For example, the lever section 72 could incorporate upper and lower flanges and the intermediate section 70 could form a tongue portion that fits between the flanges. Similarly, the bushings 106 may be omitted or substituted by a bearing.

A biasing assembly 108 is provided on the deflection pivot to bias the lever section 72 to a normal position. The biasing assembly 108 illustrated in FIG. 4 is primarily comprised of a torsion spring 112. The torsion spring 112 is arranged coaxially with the deflection pivot bolt 104 and is separated from the intermediate section 70 by a washer 114. The biasing assembly 108 also comprises a retaining spool 116, which supports the resilient torsion spring 112 from the underneath side and centers it about the deflection axis D and a nut 110 secures the spool 116. Both ends 118, 120 of the torsion spring 112 extend axially from the body of the spring 112. One end 118 of the torsion spring 112 is retained in a suitable cavity in the lever section 72 and the other end 120 is retained in an aperture in the spool 116. With this arrangement, the torsion spring 112 biases the lever section 72 into a normal position where the end of the reach bolt 96 abuts an edge surface of the intermediate section 70, as illustrated in FIG. 2. Minor adjustments to the orientation of the lever section 72 with respect to the handlebar axis H may be made by adjusting the reach bolt 96. Of course, the torsion spring 112 may be replaced by a different biasing member, such as an extension spring, strip of spring steel, rubber strands or surgical tubing.

A preferred handlebar mount 68, intermediate section 70 and lever section 72 are machined from aluminum. However, other suitable rigid materials may also be used, including steel, plastics or composites. Additionally, other methods of shaping the components may be used, such as casting, forging or injection molding.

When constructed substantially as described above, the clutch lever 52 advantageously performs normal control lever functions comparably with a conventional control lever. FIG. 2 illustrates the clutch lever 52 mounted to a handlebar 50. The intermediate section 70 is in a relaxed position wherein the ball end 92 of the lever section 72 defines a first perpendicular distance (DR) from the handlebar axis H. The intermediate section 70 of the lever assembly 52 is adapted to retain the end, or anchor, of a conventional bowden wire, or control cable 122. A cable adjustment mechanism 124 is provided to increase or decrease tension in the control cable 122, as is well known. To operate the control lever 52, the motorcycle rider uses one or more fingers engaging the finger grip portion 88 of the lever section 72 to rotate the lever 52 toward the handlebar 50. The reach bolt 96 transfers the force input of the lever section 72 into the intermediate section 70, causing the intermediate section 70 to rotate about the lever pivot axis L to achieve an actuated position, wherein the ball end 92 of the lever section 72 defines a perpendicular distance (DA) from the handlebar axis H. The rotation of the intermediate section 70 exerts a pulling force on the control cable 122 and, in the present situation, disengages a manual clutch. Obviously, the lever assembly 52 can be adapted for use with a mechanical or hydraulic brake assembly or an engine decompression device.

Figure 5:
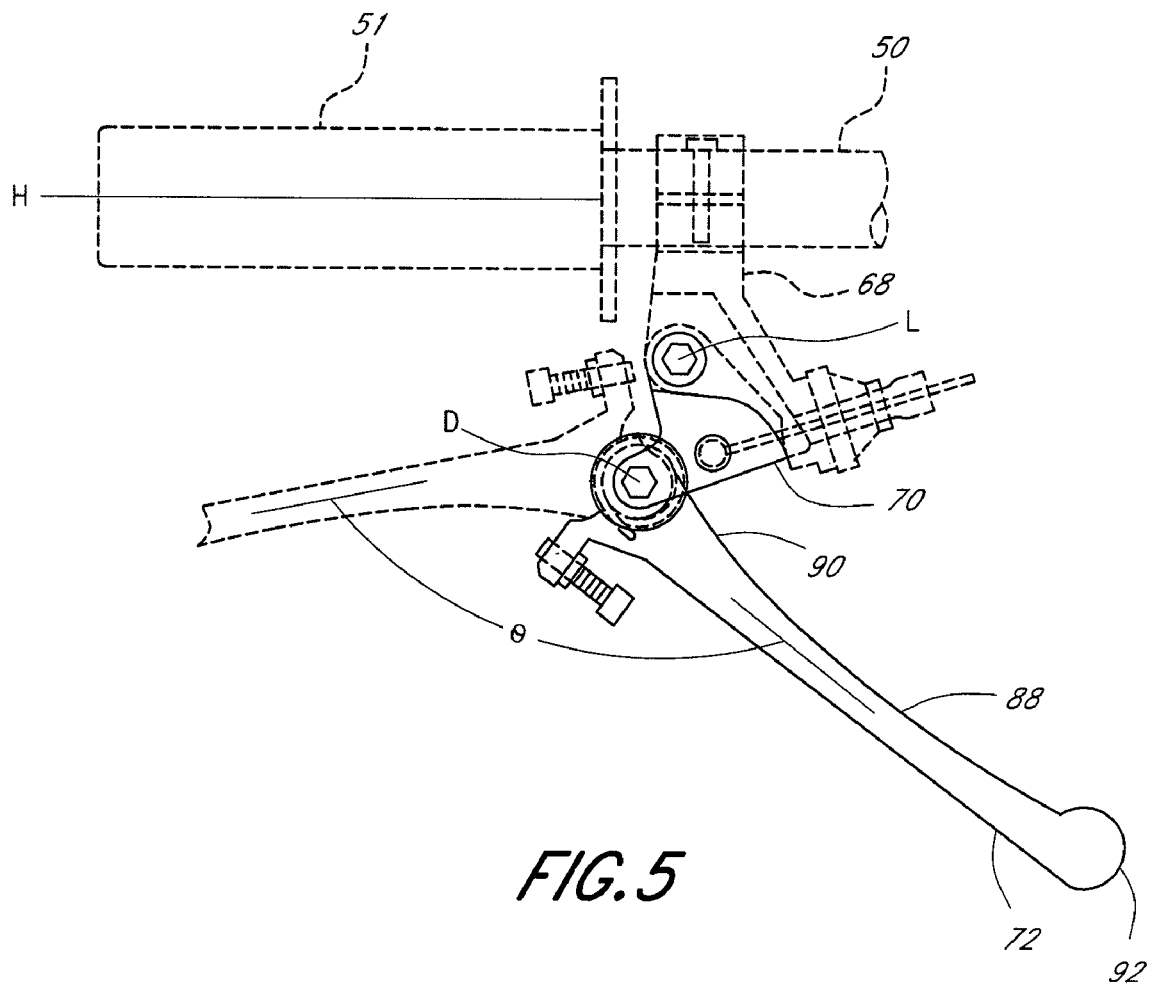
FIG. 5 is a plan view of the control lever of FIG. 2, shown in a fully deflected position.

The construction of the deflection pivot advantageously allows the lever section 72 to rotate towards a fully deflected position (represented by Θ in FIG. 5), to reduce the likelihood of the lever 52 being damaged or broken in the event the motorcycle 30 overturns. The biasing member 108 is resistive enough to retain the lever 52 in its normal position (FIG. 2) when the motorcycle is traversing rough terrain, but allows the lever section 72 to deflect upon forcibly striking an object, such as the ground.

Off-road motorcycle riding, and racing in particular, results in large, substantially vertical force inputs to the motorcycle 30. These force inputs result from the motorcycle 30 traversing rough terrain and landing from jumps. Modern motorcycles allow racers to routinely jump distances of well over 100 feet, at heights of well over 30 feet. To resist the vertical forces encountered upon landing from such heights, the deflection pivot axis D is advantageously arranged in a non-horizontal and, preferably, a substantially vertical orientation, limiting the movement of the lever section 72 to a non-vertical and, preferably, generally a horizontal plane. As a result, the lever section 72, and the entire portion of the assembly which pivots about the lever pivot axis L is prevented from moving in response to vertical force inputs, ensuring that it will remain accessible to the rider of the motorcycle 30, even upon landing from extreme heights.

In order to fully understand advantages of the present invention, it is necessary to provide a discussion of design parameters involved with control levers generally, and bowden wire clutch levers in particular. The clutch lever 52 on the motorcycle 30 functions to convert rotational motion of the lever 52 about its lever pivot axis L into linear motion suitable to actuate the bowden wire, or control cable 122. The amount of linear motion of the control cable 122 is generally referred to as the "cable pull". A fixed minimum amount of cable pull is required to operate the component connected to the lever 52, in the present situation to disengage a manual clutch. Several variables influence the amount of cable pull a control lever is capable of producing, including: lever pull, the linear distance from the lever pivot axis L to the cable anchor and the linear distance from the lever pivot axis L to the finger grip portion 88 of the lever 52.

The "lever pull" is defined as the linear distance the finger grip portion 88 of the lever 52 is capable of moving toward the handlebar axis H. The amount of lever pull is limited primarily by the distance that the finger grip portion 88 can be placed away from the handlebar axis H and remain comfortable for the average rider to grasp with one or more fingers. This is commonly referred to as the "reach" of the lever. Obviously, this value may vary, however in practice the reach does not usually exceed about 3 inches. Accounting for the average thickness of a handlebar 50 and handgrip 51 combination, the lever pull is approximately 2-⅜ inches at a theoretical maximum. However, the theoretically available lever pull is not often realized in off-road motorcycling because it is impractical, and often unsafe, for a rider to remove all four fingers from the handgrip 51 to actuate the lever 52. Typically, a rider will use one or two fingers to actuate the clutch lever 52 while constantly maintaining a grip on the handlebar 50 with the remaining fingers. In this scenario, the lever pull is limited by the finger grip portion 88 of the lever 52 striking the fingers remaining on the handlebar. This value may also vary widely, however in practice the maximum useful lever pull available is approximately one (1) inch when using one or two fingers to actuate the control lever 52. Additionally, it is desirable to have the lever pull be at a minimum in order to allow the rider to shift gears quickly.

A second variable affecting the amount of cable pull in a control lever 52 is the linear distance between the cable anchor and the lever pivot axis L (cable distance). The amount of cable pull increases for a given lever pull as the linear distance between the cable anchor and the lever pivot axis L increases. However, practical concerns restrain this distance from becoming too great. For example, increasing the distance between the cable anchor and the lever pivot axis L necessarily increases the amount the lever assembly 52 protrudes from the handlebar axis H, increasing the chances of breaking the lever assembly 52, or a component thereof, in the event of a crash. Additionally, due to the rotational movement of the cable anchor around the lever pivot axis L, increasing the linear distance between them increase the rotational element of the cable anchor's movement which, in turn, increases the friction between the control cable 122 and its housing. Both results are especially undesirable in off-road motorcycling, and off-road motorcycle racing in particular. In practice, and in the illustrated embodiment, the cable distance is approximately one (1) inch.

A third variable influencing the cable pull of a control lever 52 is the linear distance between an inner edge of the finger grip portion 88 and the lever pivot axis L (lever distance). Increasing this distance reduces the effective cable pull of a control lever 52. In practice, and in the illustrated embodiment, a typical lever distance is approximately 2-½ inches. In a multi-pivot design, such as that illustrated by Warren et al., the lever distance is increased to approximately 3-½ inches, in order to accommodate the multiple pivot assemblies. With consideration of the practical constraints on the other variables influencing cable pull, as discussed immediately above, the performance of the lever 52 is optimized by reducing the distance between the finger grip portion 88 and the lever pivot axis L. This can be best illustrated by creating an equation describing the relationship between the cable pull, the cable distance, the lever pull and the lever distance.

As a result of the cable anchor and the finger grip portion 88 both rotating about the lever pivot axis, the ratio of the lever pull to the lever distance is equivalent to the ratio of the cable pull to the cable distance. In terms of the cable pull, the equation becomes: cable pull=cable distance*(lever pull/lever distance). A table is constructed illustrating the effect that changing the lever distance has on the amount of cable pull. The standard values of one (1) inch for both the lever pull and the cable distance are used for the sake of comparison, and for the practical reasons described above.

TABLE 1

| LEVER DISTANCE (inches) | CABLE PULL (inches) | Δ (%) |
|---|---|---|
| 2.5 | 0.40 | — |
| 3.0 | 0.33 | 20.0 |
| 3.5 | 0.29 | 40.0 |
| 4.0 | 0.25 | 60.0 |
| 4.5 | 0.22 | 80.0 |

As illustrated in the table, the cable pull becomes greater as the lever distance is decreased. The preferred lever distance of approximately 2-½ inches achieves a 20% increase in cable pull over a similar construction having a ½ inch increase in lever distance. The increase in cable pull over a construction, such as illustrated by Warren et al., having an increase of one (1) inch in lever distance is 40%. A 60% increase in cable pull is achieved over a similar construction in which the lever distance is increased by only 1-½ inches.

The construction of preferred embodiments of the present invention advantageously retains a similar lever distance to that of a conventional control lever thereby providing a similar amount of cable pull as a conventional lever. This produces advantages over the more complex folding lever designs, which necessarily increase the lever distance. As the lever distance increases, a greater amount of lever pull is required to achieve a cable pull sufficient to disengage the clutch, which results in increased time to shift gears. This results in valuable time lost for each shift during the course of a race and has prevented previous folding lever designs from being practical for more serious off-road motorcyclists. Additionally, if the increase in the lever distance is too great, it may no longer be possible to disengage the clutch without pulling the lever 52 all the way to the handlebar 50. This would require the rider to completely release his grip of the handlebar 50 with his fingers in order to shift the transmission. This also inhibits the more complex folding lever designs from being practical for more than light off-road use.

In addition to performing control functions equivalently to conventional control levers, preferred embodiments of the present invention advantageously inhibit damage or breakage in the event of the motorcycle 30 overturning or crashing. As mentioned previously, the front wheel 42, front suspension and handlebar 50 are journalled for rotation about a steering axis of the frame 34 from a neutral position, with the front wheel 42 pointing straight ahead, to a rotated position approximately 43-45° from the neutral position in each direction. Additionally, the end surface of the handlebar grip 51, a portion of the front wheel 42 and a rear portion of the motorcycle 30 define a plane. If the motorcycle is overturned on substantially flat ground, the described plane will substantially correspond with the ground. The rear portion of the motorcycle 30 that defines a point in the plane will vary depending on the specific geometry of the motorcycle 30, but will likely include one of the following components: the footpeg 54, the swingarm 38, the rear wheel 36 or the side panel 66. Advantageously, in preferred embodiments of the control lever 52, the lever section 72 is capable of deflecting about its deflection axis D so as to be located between the motorcycle 30 and the described plane (or ground) in order to reduce the likelihood of damage to the lever 52. In a presently preferred embodiment, the deflection axis D is located between the inner edge of the finger grip portion 88 and the lever pivot axis L when moving generally coaxial to the handlebar axis H, and the lever pivot axis L and a leading edge of the intermediate section 70 when moving generally normal to the handlebar axis H.

A deflection distance of the lever section 72 is defined by the normal distance between a first line extending perpendicular to the handlebar axis H through the center of the ball end 92 in its normal position and a second line extending perpendicular to the handlebar axis H through the center of the ball end in its fully deflected position. An increase in the deflection distance results in an increase in the ability of the lever section 72 to deflect inward of the defined plane, and therefore continue to deflect in response to a force input from the ground without reaching its fully deflected position. The deflection distance is influenced by the linear distance from the lever pivot axis L to the ball end 92 (lever length) and the angular rotation of the lever section 72 from its normal position to its fully deflected position (deflection angle). An increase in the deflection angle results in an increased deflection distance. A reduction in lever length (e.g., the deflection pivot moving toward the ball end 92) results in a reduced deflection distance for a given deflection angle.

The lever length may vary widely, however it is typically desirable for the ball end 92 to be substantially proximate the end surface of the handlebar grip 51. Such a construction increases the effective length of the finger grip portion 88 of the lever 52 and allows the rider of the motorcycle 30 convenient access to the finger grip portion 88 throughout a wide range of hand positions on the handgrips 51. A typical lever length to achieve these goals is approximately 5-½ inches. Desirably, the lever section 72 does not significantly extend beyond the end surface of the handgrip 51 and desirably is no longer than ¾ inches beyond the end surface of the handgrip 51. Accordingly, the lever is desirably between 3 inches and 6-½ inches in length.

The likelihood of damage to the lever 52, and therefore the desired deflection distance of the lever section 72, in the event of the motorcycle 30 overturning depends at least in part on the angular position of the handlebar 50 when the left side of the motorcycle strikes the ground. Assuming the clutch lever 52 is mounted on its typical position on the left side of the handlebar 50, the risk of damage is slightest when the handlebar 50 is fully rotated to the right of its neutral position. The likelihood of damage to the clutch lever 52 is increased if the motorcycle 30 strikes the ground with the handlebar 50 in its neutral position. In this situation, a deflection angle of approximately 80-90°, with a lever length of 5-½ inches, may be sufficient to prevent damage to the control lever 52.

The likelihood of damage to the clutch control lever 52 is perhaps greatest if the motorcycle 30 strikes the ground with the handlebar 50 fully rotated to the left side of its neutral position. In this situation, a deflection angle of at least approximately 120° is preferred. Advantageously, the illustrated embodiment in FIGS. 2-5 provides a deflection angle of approximately 132° with a lever length of 5-½ inches. The increased deflection angle provides a safety factor useful in the event that a portion of the ground on which the motorcycle 30 overturns is uneven or irregular.

The table below illustrates the change in deflection distance for a given change in the deflection angle. The table shows values for a lever assembly having a lever length of 5-½ inches. As illustrated in the table, a collapsible lever constructed similarly to the above described embodiment has a deflection distance 66.9% greater than a folding lever capable of only 90° of angular rotation.

TABLE 2

| DEFLECTION ANGLE (degrees) | DEFLECTION DISTANCE (inches) | % IMPROVEMENT FROM 90° (%) | % IMPROVEMENT FROM 100° (%) |
|---|---|---|---|
| 90 | 5.50 | — | — |
| 100 | 6.46 | 17.4 | — |
| 110 | 7.38 | 34.2 | 14.3 |
| 120 | 8.25 | 50.0 | 27.7 |
| 132 | 9.18 | 66.9 | 42.1 |
| 141 | 9.77 | 77.7 | 51.3 |

Figure 6:
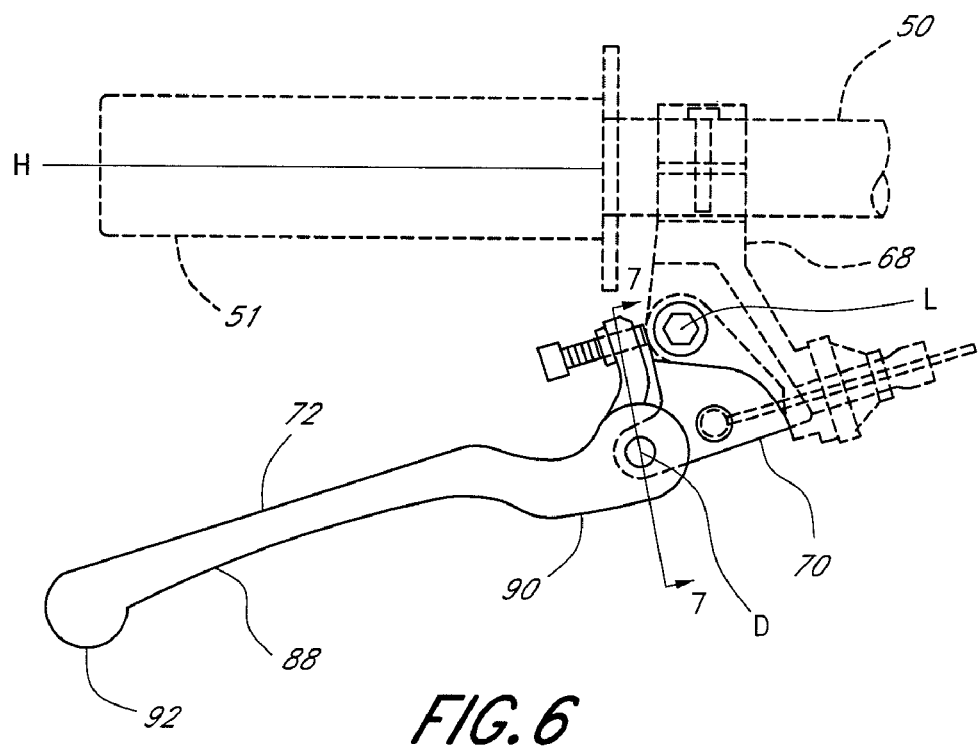
FIG. 6 is a plan view of a second preferred embodiment of a collapsible control lever adapted to disengage a manual clutch assembly, shown in a relaxed position.
Figure 7:
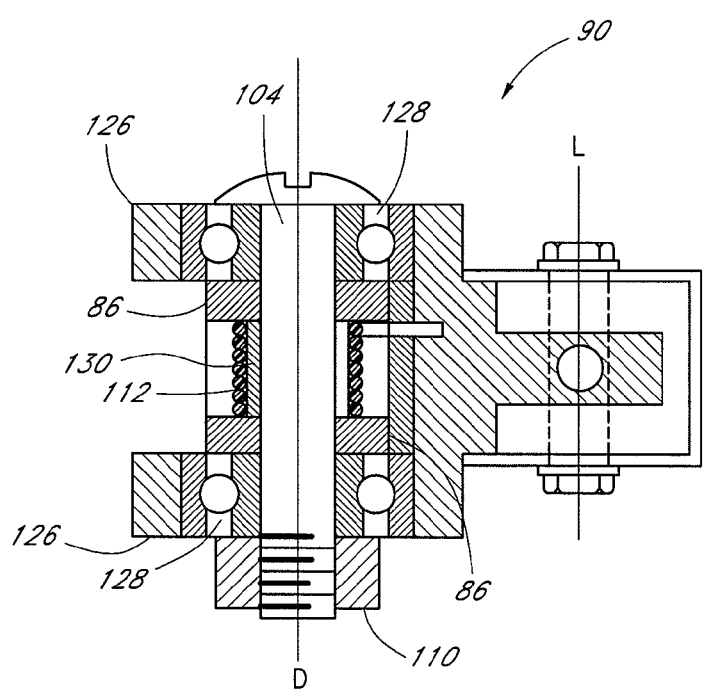
FIG. 7 is a cross sectional view of the control lever of FIG. 6 taken along section line 7-7 in FIG. 6.
Figure 8:
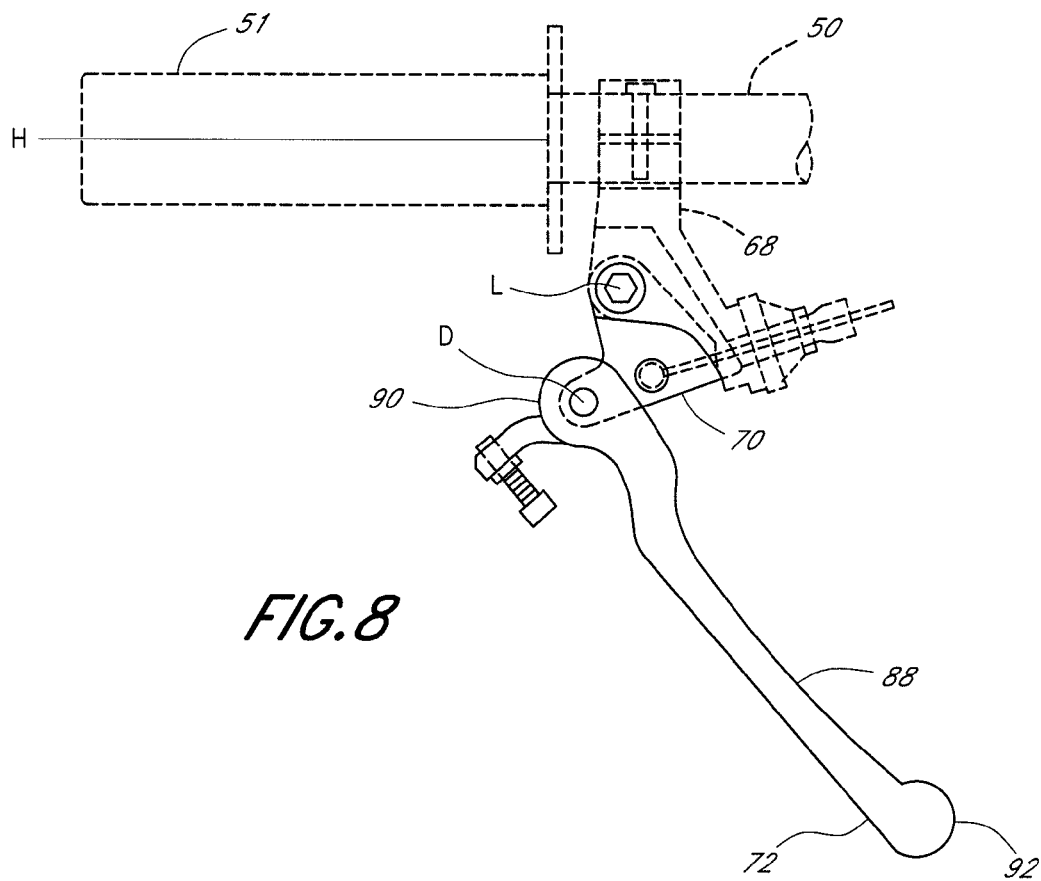
FIG. 8 is a plan view of the control lever of FIG. 6, shown in a fully deflected position.

With reference to FIGS. 6-8, a second preferred embodiment of a manual clutch control lever 52 will now be described. The embodiment illustrated in FIGS. 6-8 is similar in structure and function to the previously described embodiment, therefore the same reference numerals will be used to identify substantially equivalent structures, where appropriate.

FIG. 7 shows the pivot portion 90 of the lever section 72 comprising a pair of flange sections 126. The flanges 126 of the lever section 72 are spaced apart to accommodate the flange sections 86 of the intermediate section 70. A deflection pivot bolt 104, defining a deflection axis D, is passed through corresponding apertures in the lever section 72 and the intermediate section 70. The lever section 72 is fixed substantially coaxially to the bolt 104 through a pair of roller bearings 128 Thus, the lever section 72 is capable of rotation relative to the intermediate section 72 about the deflection axis D. Obviously, the roller bearings 128 may be replaced by a different type of bearing, a bushing or omitted altogether. The biasing member 108, primarily comprising a torsion spring 112, is mounted between the flanges 86 of the intermediate section 70, substantially coaxially with the deflection axis D and is separated from the bolt 104 by a bushing 130. A nut 110 secures the bolt 104 in place.

The operation of the control lever 52 illustrated in FIGS. 6-8 is similar to the function of the previously described embodiment. For use as a control lever, one end of the biasing member 118 engages the lever section 72 and the other end engages the intermediate section 70, biasing the lever section 72 to a normal position (FIG. 6). Similarly to the previous embodiment, to operate the control lever 52, the engages the finger grip portion 88 of the lever section 72 to rotate the lever 52 toward the handlebar 50. The reach bolt 96 transfers the force input of the lever section 72 into the intermediate section 70, causing the intermediate section 70 to rotate about the lever pivot axis L to achieve an actuated position. This action exerts a pulling force on the control cable 122 and, in the present situation, disengages a manual clutch.

FIG. 8 illustrates the lever section 72 of the control lever assembly 52 in a fully deflected position. The illustrated embodiment is capable of achieving a deflection angle of approximately 141° and has a lever length of 5-½ inches, resulting in a slightly greater deflection distance than the first illustrated preferred embodiment. Additionally, the enlarged flanges 126 of the lever section 72 add strength to the deflection pivot and the entire lever assembly 52.

Figure 9:
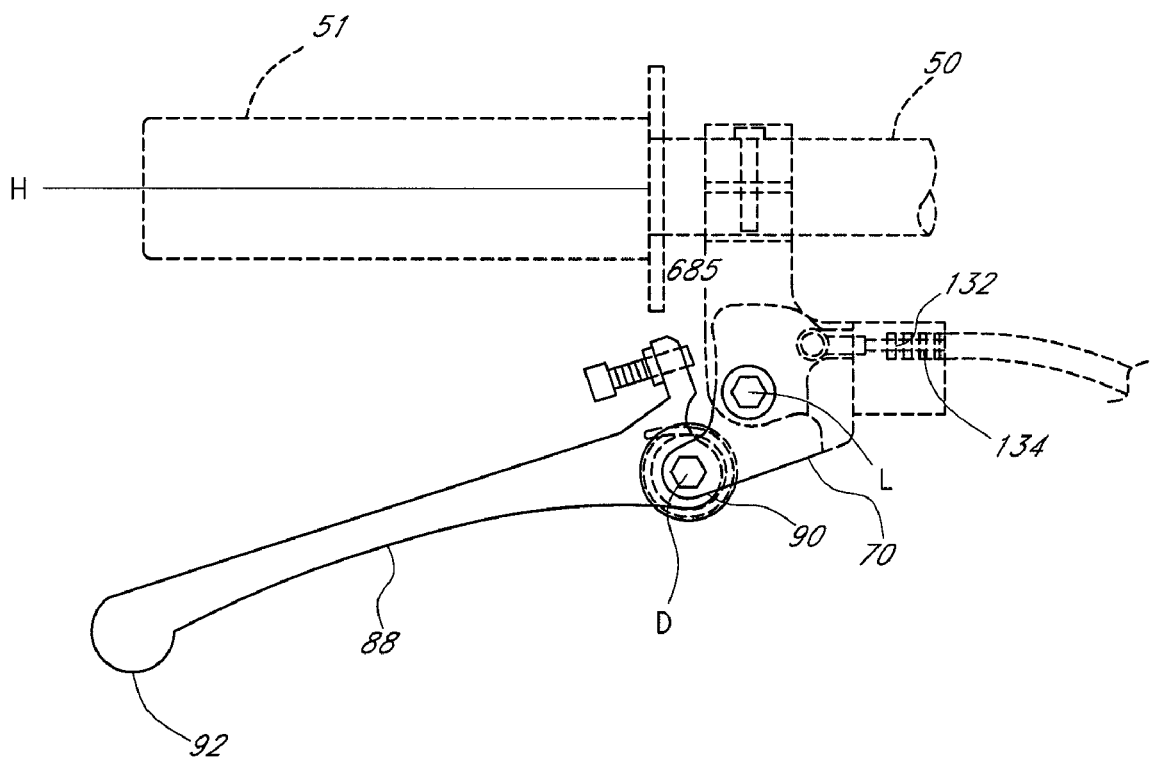
FIG. 9 is a plan view of a preferred embodiment of a collapsible control lever adapted to disengage a hydraulic clutch assembly, shown in a relaxed position.

FIG. 9 illustrates a preferred embodiment for use with a hydraulic clutch assembly. The handlebar mount 68 and intermediate section 70 are modified such that rotation of the intermediate section 70 results in an actuating surface 132 exerting a pushing force on a hydraulic master cylinder plunger 134.

Figure 10A:
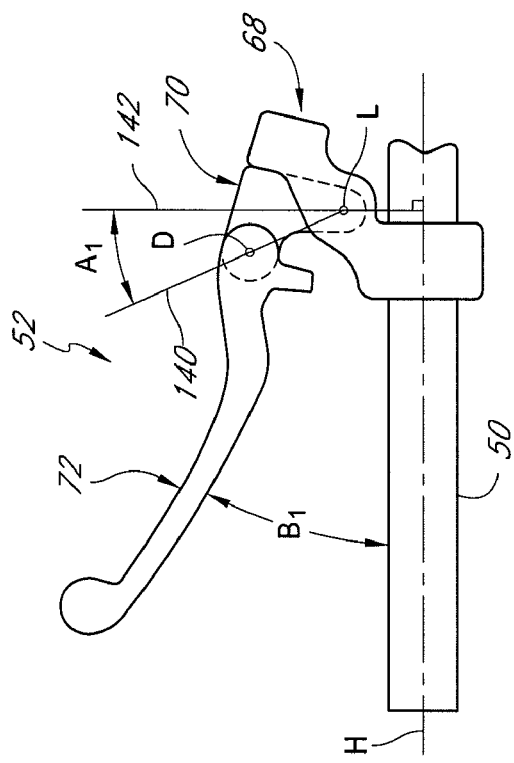
FIGS. 10a and 10b illustrate one arrangement of a control lever advantageously suited for use by a rider that uses his or her index finger or index and middle fingers to actuate the lever assembly.
Figure 10B:
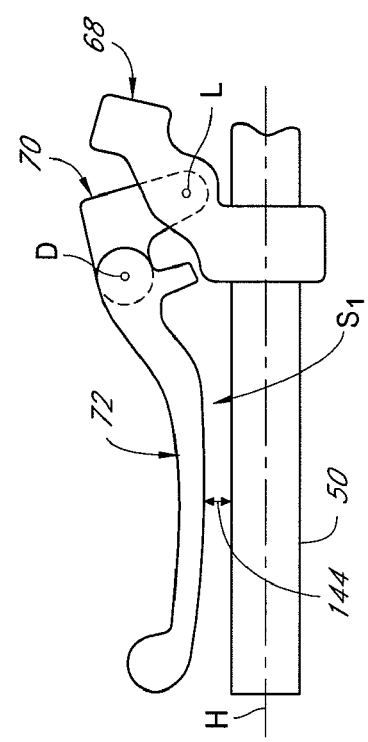
Figure 11A:
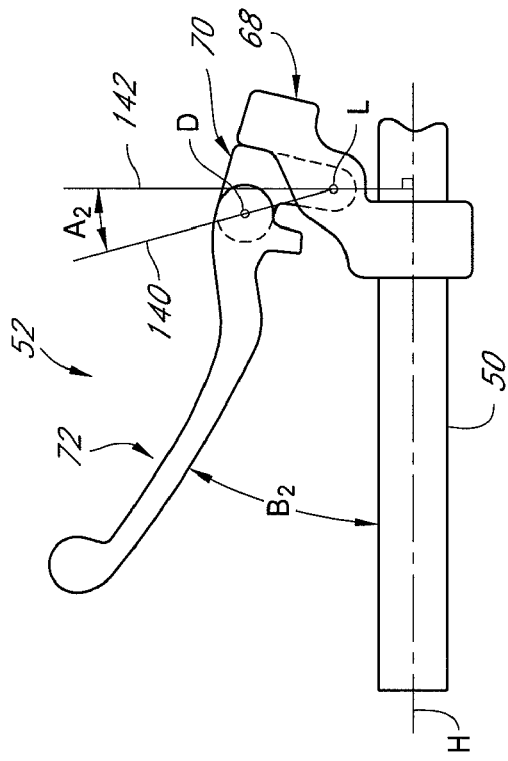
FIGS. 11a and 11b illustrate a modification of the control lever of FIGS. 10a and 10b advantageously configured for use by a rider that uses his or her middle finger only to actuate the lever assembly.
Figure 11B:
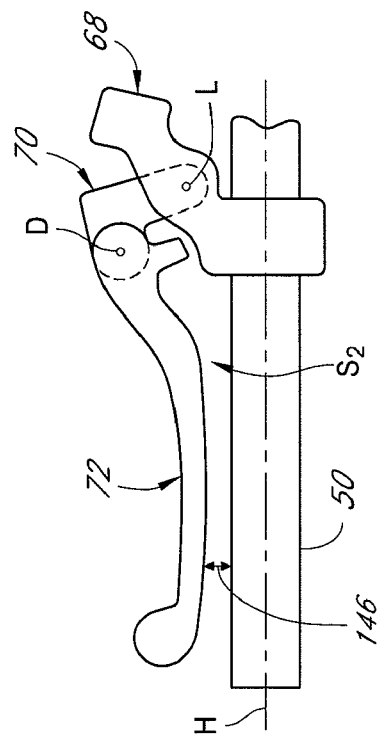

FIGS. 10a, 10b, 11a and 11b illustrate the effect of altering the dimensions of the intermediate section 70 to configure the lever assembly 52 to suit the preferences of an individual rider. FIG. 10a illustrates a lever assembly 52 configured substantially as described above with reference to FIGS. 1-9 in a released position, while FIG. 10b illustrates the lever assembly 52 of FIG. 10a in an actuated position. FIG. 11a illustrates a modified version of the lever assembly 52 of FIGS. 10a and 10b in a released position. FIG. 11b illustrates the lever assembly 52 of FIG. 11a in an actuated position.

With reference to FIG. 10a, an imaginary first line 140 is defined by a line passing through the deflection axis D and the lever axis L and being oriented substantially perpendicular to both axes D and L. An imaginary second line 142 is defined by a line that is substantially perpendicular to the handlebar axis H and passes through the lever axis L and, preferably, is substantially perpendicular to the lever axis L. An angle A1 is defined between the lines 140 and 142. Desirably, the first angle A1 is less than or equal to about 28 degrees. In the illustrated embodiment of FIGS. 10a and 10b, the angle A1 is equal to approximately 28 degrees.

Furthermore, an angle B1 is defined between the lever section 72 and the handlebar axis H. Desirably, the second angle B1 is between about 20 and 25 degrees. In the illustrated embodiment of FIGS. 10a and 10b, the angle B1 is approximately 23.4 degrees. Such dimensions of the angle B1 positions the lever section 72 in a desirable location for most riders, while still providing enough lever movement before the lever section 72 contacts the rider's fingers or the handlebar 50. However, other angles may also be used to suit a particular individual or application.

With the arrangement as configured in FIGS. 10a and 10b, when the lever assembly 52 is moved to its actuated position, the lever section 72 is generally parallel to the handlebar axis H. The lever section 72 preferably has a slightly curved shape and, thus, the shortest distance between the lever section 72 and the handlebar 50 occurs near the middle of the lever section 72. Accordingly, a relatively small space S1 is created between an inward end of the lever section 72 and the handlebar 50 as indicated by the arrow S1 in FIG. 10b. Such an arrangement is advantageous for a rider that only uses his or her index finger, or both the index finger and middle finger, to operate the control lever assembly 52 as the space S1 does not need to be large because the rider's index finger is not between the lever section 72 and the handlebar 50.

With reference to FIGS. 11a and 11b, the orientation of the lever section 72 relative to the handlebar 50 may be altered by changing the relative positions of the deflection axis D and the lever axis L on the intermediate section 70 and, preferably, adjusting the lever section 72 to an angle B2 that is generally equal to the angle B1 as illustrated in FIG. 10a. As illustrated in FIG. 11a, the relative positions of the deflection axis D and the lever axis L are oriented such that an angle A2 is defined between the first line 140 and the second line 142. Desirably, the angle A2 is smaller than the angle A1. Preferably, the angle A2 is between about 12 and 16 degrees and, more preferably, about 14 degrees. As described above, preferably, the lever section 72 is adjustable to an angle B2 that is generally equal to the angle B1, as described above with reference to FIG. 10a. One arrangement for permitting the adjustment of the lever section 72 relative to the intermediate section 70 is described above with reference to FIGS. 2-5.

With reference to FIG. 11b, when the lever assembly 52 of FIG. 11a is moved to its actuated position, preferably, the lever section 72 is closer to the handlebar 50 near its outward end than it is near its inward end. Thus, the shortest distance between the lever section 72 and the handlebar 50 occurs outwardly from the center of the lever section 72. With such an arrangement, a space S2 is created between an inward end of the lever section 72 and the handlebar 50 that preferably is larger than the space S1 as shown in FIG. 10b. Thus, the lever assembly 52 of FIGS. 11a and 11b advantageously is configured for a rider that uses only his or her middle finger to operate the lever assembly 52. The space S2 provides more room to accommodate the rider's index finger, which remains between the lever section 72 and the handlebar 50.

Advantageously, the multi-piece lever assembly 52 permits cost-effective adjustment of the orientation between the lever section 72 and the handlebar in the actuated position by modifying the intermediate section 70, rather than changing the shape of the lever section 72. Because the intermediate section 70 is less complex and may be fabricated by a number of suitable manufacturing processes, it is less costly to modify in comparison to the lever section 72. Modifying the lever section 72 may require extensive reprogramming if the lever section 72 is machined or additional molds if the lever section 72 is forged or cast. In either case, the cost of modifying the lever section 72 typically is greater than the cost of modifying the intermediate section.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the present invention is not intended to be limited by the recitation of preferred embodiments, but is intended to be defined solely by the reference to the appended claims.

What is claimed is:

1. A control lever for mounting adjacent a handlebar, comprising:

an intermediate section including a first aperture defining a first axis, said intermediate section supportable relative to the handlebar by a handlebar mount for rotation about said first axis, said intermediate section further including a first flange and a second flange defining a space therebetween and a second aperture that passes through said first and second flanges, said second aperture defining a second axis;

a lever section rotatably coupled to said intermediate section for rotation about said second axis, wherein a first end of said lever section is disposed in said space between said first and second flanges of said intermediate section;

a torsional biasing member configured to apply a rotational biasing force tending to bias said lever section to a relaxed position relative to said intermediate section;

wherein said lever section and said intermediate section are rotatable together in a first direction about said first axis, and wherein said lever section is rotatable relative to said intermediate section about said second axis in a second direction opposite said first direction against said rotational biasing force of said torsional biasing member to a deflected position, wherein said torsional biasing member is located external of said space between said first and second flanges.

2. The control lever of claim 1, wherein said torsional biasing member comprises a torsion spring supported on a spool.

3. The control lever of claim 1, wherein said torsional biasing member is coaxial with said second axis.

4. The control lever of claim 1, wherein said torsional biasing member is disposed below a lower of said first and second flanges.

5. The control lever of claim 1, further comprising an abutment surface on said intermediate section configured to limit the motion of said lever section by said torsional biasing member, thereby defining said relaxed position.

6. The control lever of claim 1, wherein said relaxed position is adjustable.

7. The control lever of claim 1, wherein said lever section defines a finger grip portion.

8. The control lever of claim 7, wherein a linear distance between an inner edge of said finger grip portion and said first axis is approximately 2 ½ inches.

* * * * *